United States Patent

Marsetti et al.

(10) Patent No.: US 6,763,936 B2
(45) Date of Patent: Jul. 20, 2004

(54) CHAIN CONVEYOR

(75) Inventors: Sergio Marsetti, Castelli Calepio (IT); Rodolfo Reatti, Brivio (IT)

(73) Assignee: System Plast S.p.A., Telgate (IT)

( * ) Notice: Subject to any disclaimer, the term of this patent is extended or adjusted under 35 U.S.C. 154(b) by 0 days.

(21) Appl. No.: 10/292,763

(22) Filed: Nov. 13, 2002

(65) Prior Publication Data

US 2003/0116409 A1 Jun. 26, 2003

(30) Foreign Application Priority Data

Nov. 13, 2001 (IT) .................................... MI20010599 U

(51) Int. Cl.⁷ .............................................. B65G 15/30
(52) U.S. Cl. .................... 198/844.1; 198/850; 198/851; 198/853
(58) Field of Search ............................ 198/844.1, 850, 198/851, 853

(56) References Cited

U.S. PATENT DOCUMENTS

| 3,735,858 A | | 5/1973 | Hartwig ...................... 198/853 |
| 4,858,753 A | | 8/1989 | Hodlewsky ................. 198/853 |
| 5,058,732 A | | 10/1991 | Lapeyre |
| 5,123,524 A | * | 6/1992 | Lapeyre ...................... 198/853 |
| 5,156,264 A | | 10/1992 | Lapeyre ...................... 198/852 |
| 5,217,110 A | * | 6/1993 | Spangler et al. ............ 198/852 |
| 5,303,818 A | * | 4/1994 | Gruettner et al. ........... 198/850 |
| 5,335,768 A | * | 8/1994 | Schladweiler ............... 198/853 |
| 5,435,435 A | * | 7/1995 | Chiba et al. ................. 198/853 |
| 5,482,156 A | * | 1/1996 | Damkj r ...................... 198/853 |
| 5,586,644 A | | 12/1996 | Coen et al. ................. 198/853 |
| 5,634,550 A | * | 6/1997 | Ensch et al. ........... 198/457.05 |
| 5,904,241 A | * | 5/1999 | Verdigets et al. ........... 198/853 |
| 5,957,268 A | * | 9/1999 | Meulenkamp .............. 198/850 |
| 5,960,937 A | * | 10/1999 | Stebnicki et al. ........... 198/851 |
| 5,996,776 A | * | 12/1999 | van Zijderveld ............ 198/853 |
| 6,308,825 B1 | * | 10/2001 | Nakamura ................... 198/853 |
| 6,499,587 B1 | * | 12/2002 | Greve ......................... 198/853 |

FOREIGN PATENT DOCUMENTS

EP      0 739 830 A1    10/1996
EP      0 792 822 A1     9/1997

* cited by examiner

Primary Examiner—Richard Ridley
(74) Attorney, Agent, or Firm—Young & Thompson

(57) ABSTRACT

A chain conveyor formed from a plurality of modules or links (1a, b, c) connected together by pins c2a, b) which are inserted through holes (4, 4A) present in the modules or links (1a, b, c) and are prevented from escaping by axially counteracting elements (5) mounted in seats (6) also present in the modules or links (1a, b, c), in which the axially counteracting elements (5) present a flexible tang (5c) which, when the axially counteracting element is mounted in the seat (6), intersects an end portion (4A) of the holes (4, 4A) through which the pin (2a, b, c) is inserted, to thus prevent the pin withdrawing from the holes (4, 4A), such withdrawal however being enabled by deflecting the flexible tang (5).

11 Claims, 3 Drawing Sheets

CHAIN CONVEYOR

The present invention relates to a chain conveyor formed from a plurality of modules or links hinged together by pins which are inserted through holes present in said modules or links and are prevented from escaping by axially counteracting elements mounted in seats also present in said modules or links.

Chain conveyors of this type are known for example from EP 0 739 830 A1, EP 1 052 197 A1 and U.S. Pat. No. 4,893,710. Common to all these known conveyors are the axially counteracting elements, which comprise a substantially flat insert to be inserted into a seat represented by a slot which extends perpendicular to the axis of the holes into which the pin is inserted. To ensure that the insert remains in place in the slot, the insert is provided with lateral projecting parts for snap-engagement with parts of the module, generally with the surround of a hole housing the pin. When for wear or breakage reasons a module or link has to be replaced, the corresponding inserts have to be removed from their seats, a difficult operation, in order to be able to withdraw the pins and remove the thus released module and replace it with another. It can also happen that as the inserts are removably engaged in the relative seats provided in the modules, they can accidentally escape from said seats, so enabling the pins to escape.

An object of the present invention is to provide a chain conveyor of the indicated type in which the withdrawal of the pin does not require the removal of the insert from its seat, so making the withdrawal of the pin and hence the removal of the damaged or worn module or link an easier and more comfortable operation. A further object is to provide a conveyor in which the inserts can no longer accidentally escape from their seats.

These and further objects which will be more apparent from the ensuing detailed description are attained by a chain conveyor in accordance with the teachings of the accompanying claims.

The invention will be better understood from the following detailed description, which is provided by way of example and given with reference to the accompanying drawings, in which.

Figure 1:
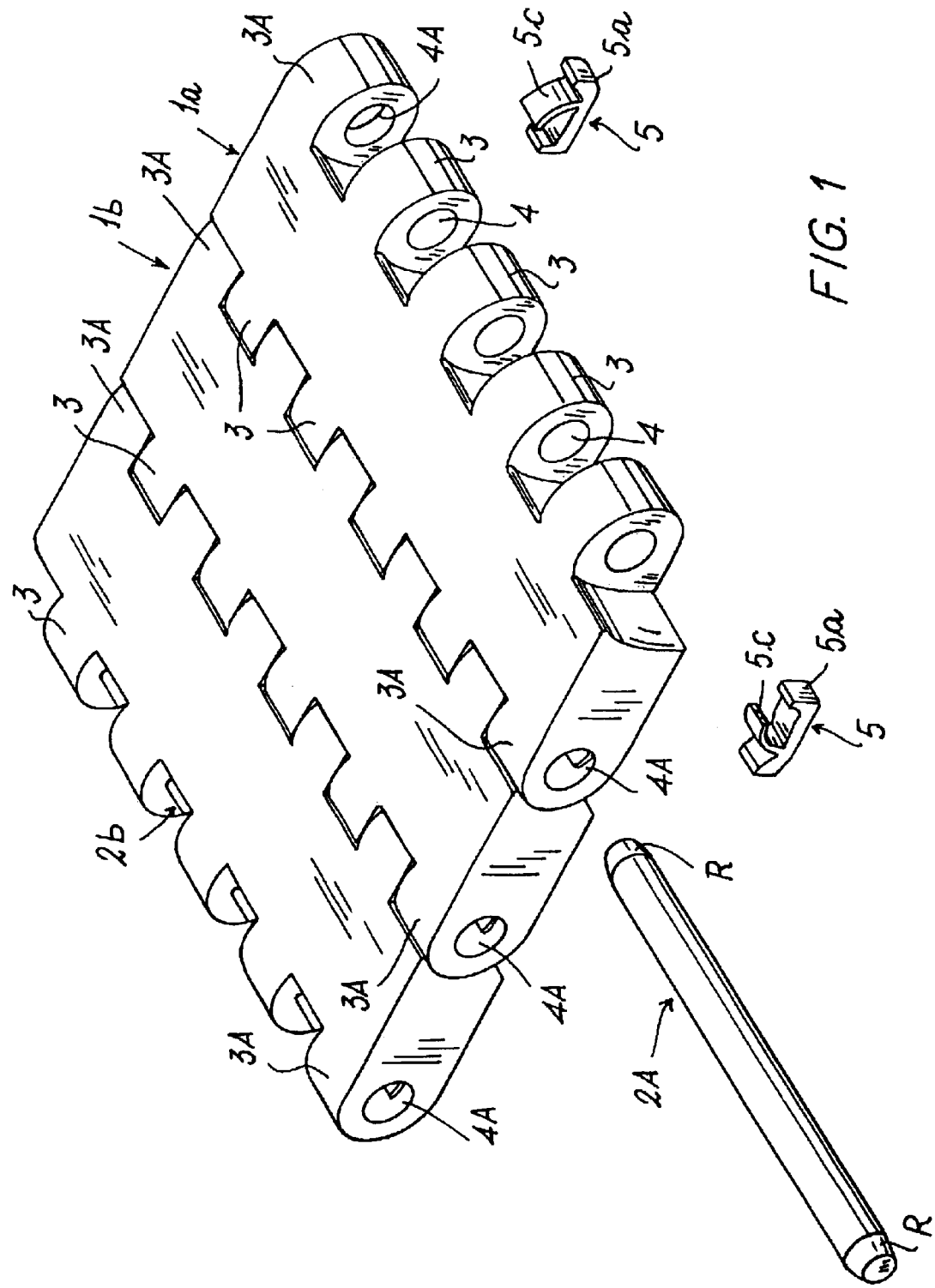
FIG. 1 is a perspective view from above of three modules or links of a chain conveyor hinged together by pins, one of which is shown, together with two axially counteracting element.
Figure 2:
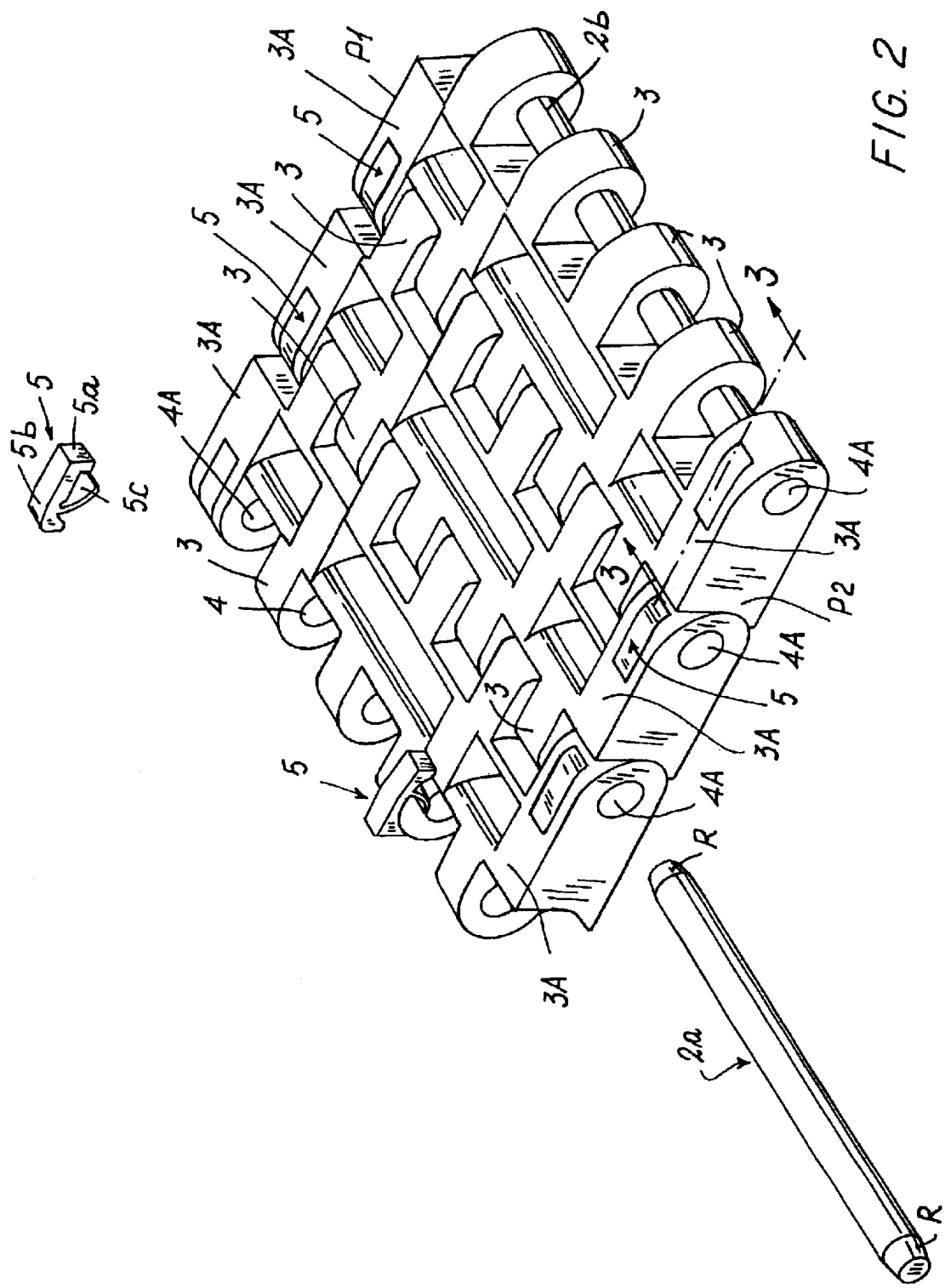
FIG. 2 is a view similar to FIG. 1 but taken from below.

The chain conveyor comprises a plurality of modules or links hinged together by pins inserted through holes in the modules or links. FIGS. 1 and 2 show three of such modules or links indicated by 1*a, b, c* and two of such pins, indicated by 2*a, b,* one of which is shown mounted, the other being shown separated.

The modules or links 1*a, b, c* present two comb conformations on opposite sides. The "teeth" of these comb conformations consist of spaced-apart parallel projecting parts 3 provided with mutually coaxial through holes 4. The "teeth" of one of such conformations are offset from those of the opposite side, in order to obtain the hinged connection within the conveyor as shown. The hinge pins 2*a, 2b* are inserted through the holes 4 of two adjacent modules or links.

The pins 2*a, 2b* have tapered ends R.

The two comb conformations of each module or link have an end projecting part (tooth), indicated by the reference numeral 3A, which differs from the others in that it comprises a seat 6 for mounting an insert 5, the purpose of which is to prevent the pin escaping from the holes in which it is mounted. The hole through the end part 3A is indicated by 4A. The end projecting parts or teeth 3A of the comb conformations delimit opposite sides P1 and P2 of the module or link. Preferably the projecting parts 3, 3A of the comb conformations of two mutually connected modules present, on each of the sides along which said modules are connected together, end projecting parts 3A extending in correspondence with one of the ends of each side from a first module and in correspondence with the other end from the second module.

Figure 3:
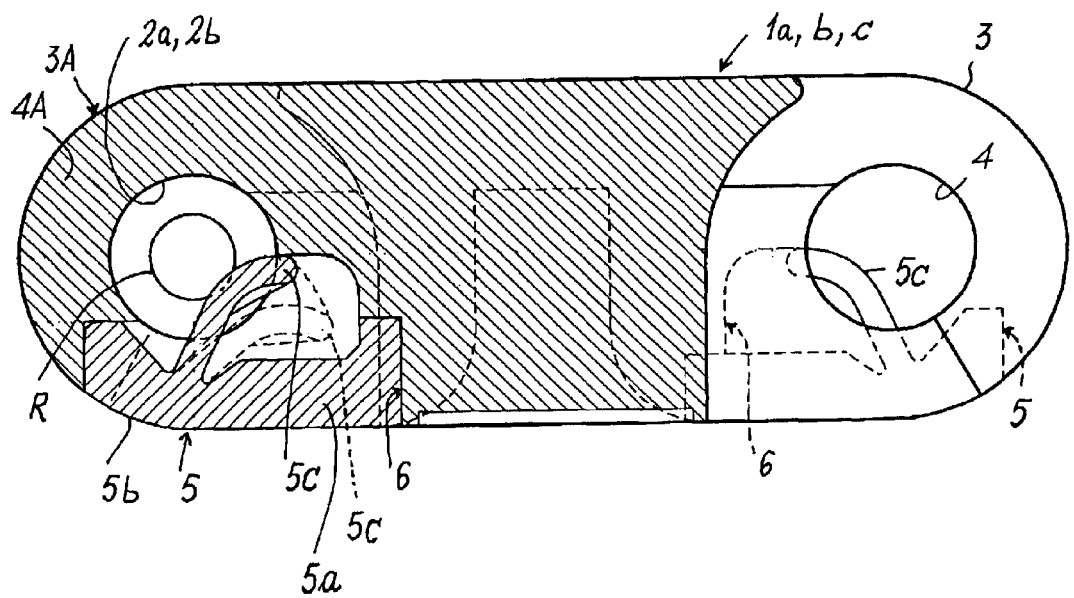
FIG. 3 is a section through a module or link taken on the line III—III of FIG. 2 but on a different scale.

The seats 6 communicate with the end hole 4A relative to the end projecting parts or "teeth" 3A (as shown in FIG. 3).

The inserts 5 present a head 5a, which is forcibly inserted into the mating seat 6 and of which the outer face 5b remains flush with the outer face of the end projecting part 3A. In this manner, once inserted into the relative seat, the inserts 5 can non longer be removed nor can they escape from the seat 6 and remain rigidly connected to the module. To improve this connection the inserts 5 can also be rigidly fixed into the relative seats in other known ways, for example by gluing.

The inserts 5 present a flexible tang 5c which, when the insert is mounted in its seat, intersects the end hole 4A of the end projecting part or "tooth" 3A to prevent the mounted pin (2A, 2B) escaping from the holes (4, 4A), its length not exceeding the distance between the inner sides of the two flexible tangs 5c pertaining to the two inserts 5 used to prevent escape of the pin from the two opposing sides P1 and P2 of the module or link. With the described inventive solution it is no longer necessary to remove the inserts from the module or link when it requires replacing due to wear or damage. In this respect, in such a situation it is sufficient to press against one end of the pin while moving the flexible tang 5c (see FIG. 3), for example with a screwdriver, through a sufficient distance to eliminate the interference with the tapered end R of the pin to enable this to be removed from the holes in which it lies.

The counteracting elements can already be inserted into the respective modules prior to conveyor assembly. In this respect, on inserting the pin into the relative hole of one of the end projecting parts 3A, the tapered tip R of the pins automatically raises the tang 5c to enable the pin to be inserted. Assembly of the conveyor modules is hence simplified as it is no longer necessary to insert the counteracting elements after inserting the connection pins 2*a, 2b*, as has to be done in known conveyors. By virtue of the invention the modules can be constructed with the counteracting elements already rigidly associated with the module.

Another advantage of the described solution is that the pin can be extracted from both sides, enabling the operator to intervene from that side which he finds more comfortable.

The module or link and the insert are preferably constructed of synthetic material, for example acetal resin.

Figure 4:
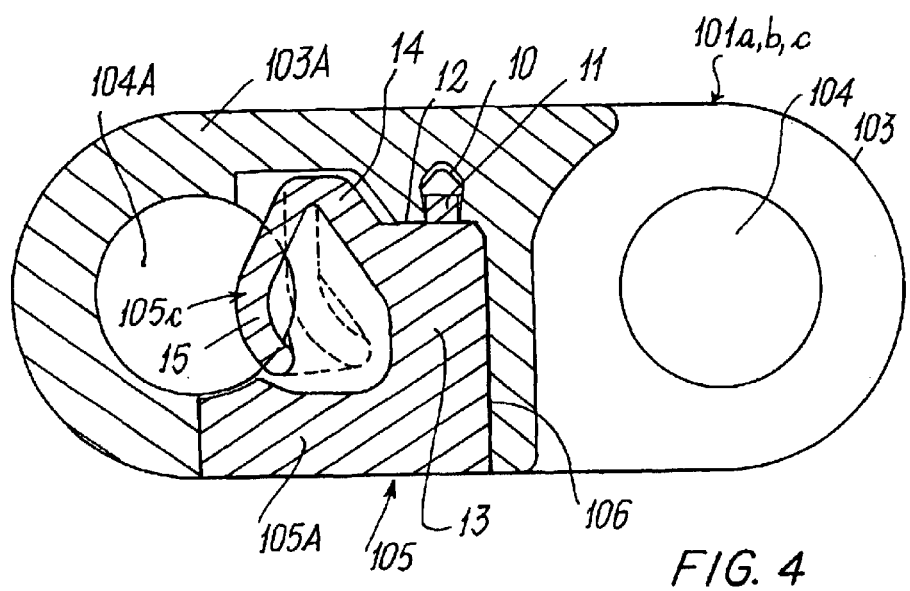
FIG. 4 is a section corresponding to that of FIG. 3, but relating to a variant.

Another embodiment of the invention is shown in section in FIG. 4. In this figure those parts equal or corresponding to those of the preceding figures are indicated by the same reference numerals plus 100.

In this embodiment the modules or links 101*a* etc. present, in their end teeth 103A, seats 106 having a different configuration from that already described, to receive the inserts 105, which differ from the preceding.

Specifically, said seats 106 present at one end a housing 10 which widens along an initial portion to then narrow along its last portion. Said housing is intended to receive, by snap-engagement or by force, an appendix 11 projecting from a face 12 of the insert 105 and shaped to achieve such an engagement.

The insert 105 also presents a flexible tang 105c intended, in this embodiment, to press against the pin (here not shown but passing through the end hole 104A) on a peripheral region of the pin which is different from that in the preceding embodiment. Specifically, said flexible tang presents a slightly hooked shape and extends from a lateral wall 13 of the insert 105, this wall being delimited by said face 12. The tang presents a raised (in FIG. 4) first portion 14 which then deflects downwards along the terminal second portion 15.

What is claimed is:

1. A chain conveyor formed from a plurality of modules or links (1a, b, c; 101a) connected together by pins (2a, b) which are inserted through holes (4, 4A; 104, 104A) present in said modules or links (1a, b, c; 101a) and are each prevented from escaping by an axially counteracting element (5, 105) mounted in a seat (6, 106) also present in a said module or link (1a, b, c; 101a), said axially counteracting element (5, 105) presenting a flexible tang (5c; 105c) which intersects an end portion (4A, 104A) of the hole (4, 4A; 104, 104A) through which a pin (2a, b, c) is inserted, to thus prevent said pin withdrawing from said hole (4, 4A; 104, 104A), such withdrawal however being enabled by deflecting the flexible tang (5) while the counteracting element is mounted in the seat, the counteracting element and the seat being two separate and discrete elements that are positively but detachably engaged with each other.

2. A chain conveyor as claimed in claim 1, wherein the modules or links (1a, b, c; 101a) present, on opposing sides, offset comb conformations formed from projecting parts (3, 3A, 103, 103A) provided with holes (4, 4A, 104, 104A).

3. A chain conveyor as claimed in claim 1, wherein at least one comb conformation presents an end projecting part (3A, 103A) in which the seat (6, 106) for the axially counteracting element (5, 105) is present.

4. A chain conveyor as claimed in claim 1, wherein the axially counteracting element (5, 105) presents a head (5a, 105a) which matches the seat (6, 106) with which it engages.

5. A chain conveyor as claimed in claim 1, wherein the seat (6, 106) communicates with an end hole (4A, 104A) for the passage of the flexible tang (5c, 105c) into said hole, this communication enabling the flexible tang (5c, 105c) to be deflected when the pin (2a, b, c) is to be withdrawn from the holes (4, 4A, 104, 104A).

6. A chain conveyor as claimed in claim 1, wherein at least one end (R) of the pins (2a, b, c) is tapered.

7. A chain conveyor as claimed in claim 1, wherein the length of the pin (2a, b, c) does not exceed the distance between the inner sides of those flexible tangs (5c, 105c) which prevent the escape of the pin from opposite sides.

8. A chain conveyor as claimed in claim 1, characterised in that the axially counteracting element is rigidly secured to the module.

9. A chain conveyor as claimed in claim 1, characterised in that the projecting parts (3, 3A, 103, 103A) of the comb conformations of two mutually connected modules present, on each of the sides along which said modules are connected together, end projecting parts (3A, 103A) extending in correspondence with one of the ends of each side from a first module and in correspondence with the other end of said side from the second module.

10. A chain conveyor as claimed in claim 1, characterised in that the seats (6, 106) for the axially counteracting elements (5, 105) are provided in correspondence with both the ends of each of the sides along which the pairs of modules are connected together, in order to lock both ends of each pin (2A, B) connecting the modules together.

11. A chain conveyor as claimed in claim 1, and means (10, 11) releasably holding the counteracting element (5, 105) in the seat (6, 106).

* * * * *